Sept. 4, 1956 J. H. BONNEAU 2,761,170
AUTOMATIC STEAM CLEANING MECHANISM FOR AUTOMOBILE WHEELS
Filed March 24, 1953 3 Sheets-Sheet 1
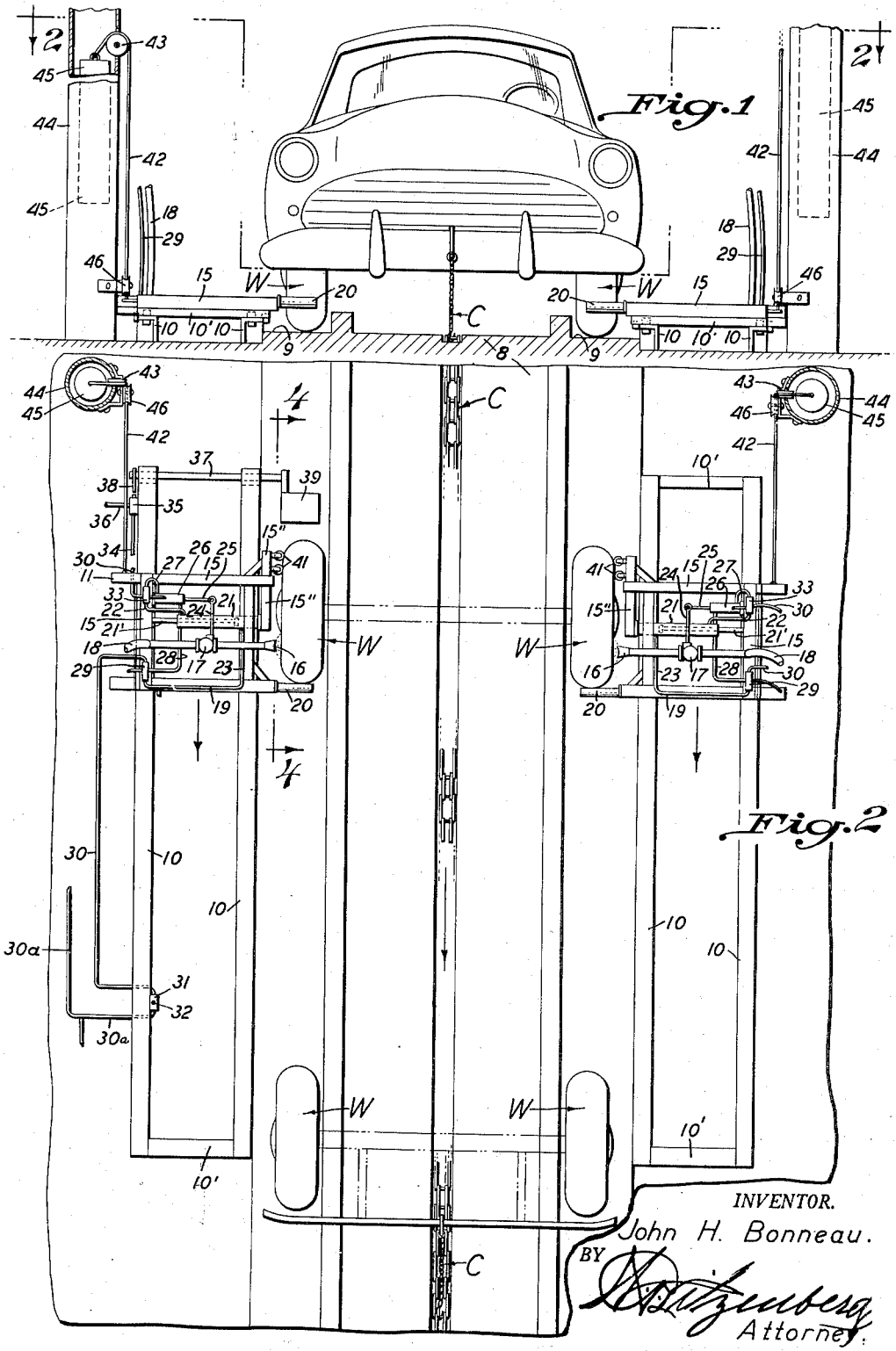
INVENTOR.
John H. Bonneau.

Sept. 4, 1956 J. H. BONNEAU 2,761,170
AUTOMATIC STEAM CLEANING MECHANISM FOR AUTOMOBILE WHEELS
Filed March 24, 1953 3 Sheets-Sheet 2
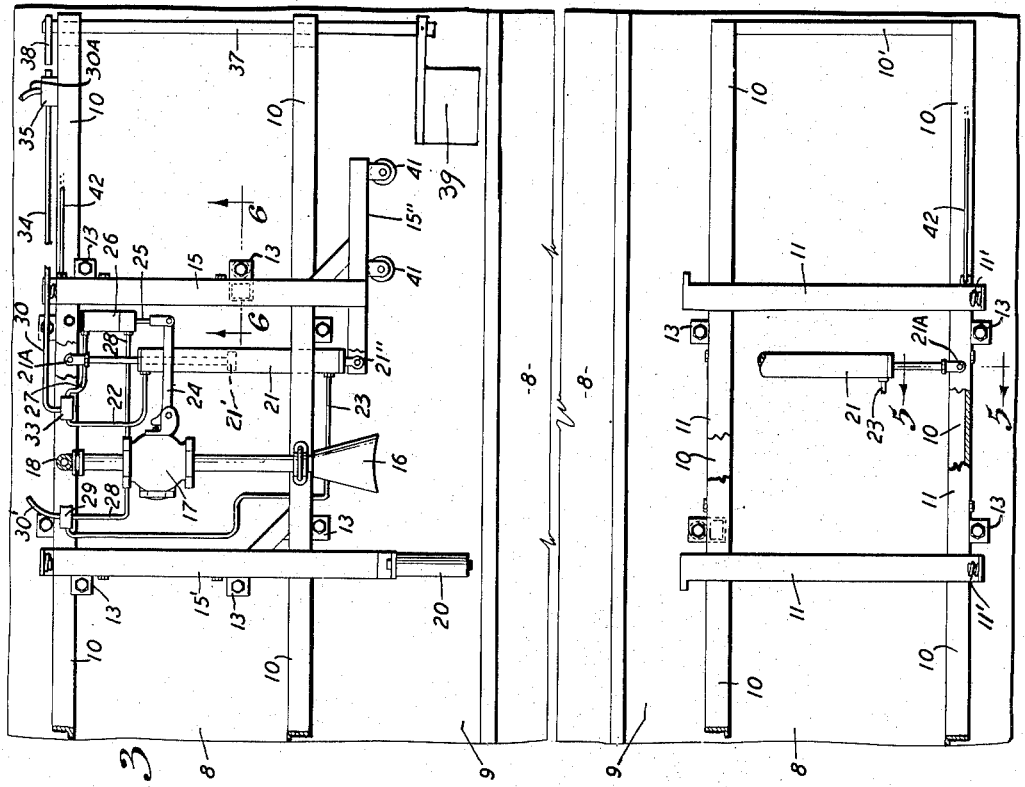
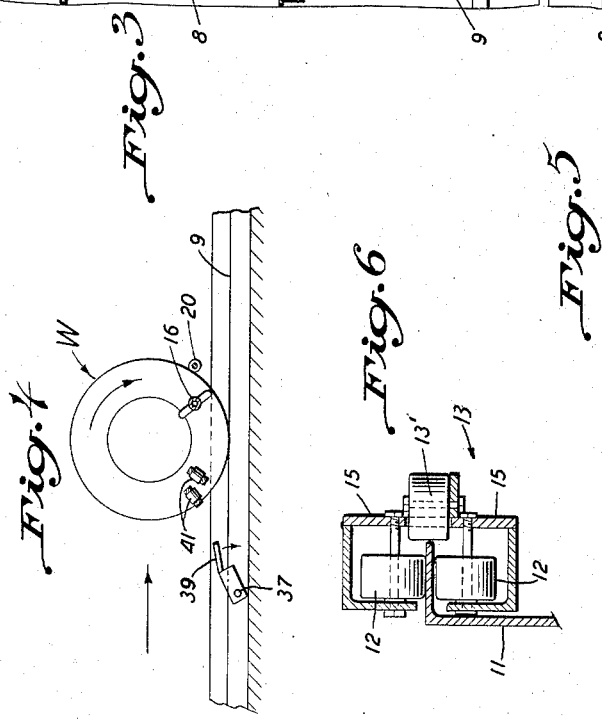
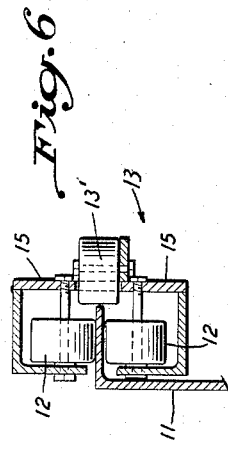
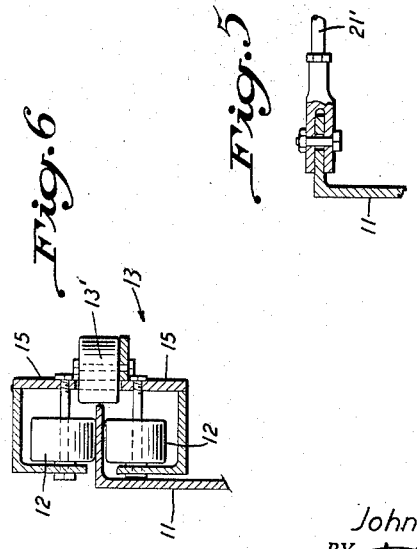
INVENTOR.
John H. Bonneau.
BY
Attorney.

United States Patent Office 2,761,170
Patented Sept. 4, 1956

2,761,170

AUTOMATIC STEAM CLEANING MECHANISM FOR AUTOMOBILE WHEELS

John H. Bonneau, Los Angeles, Calif.; Gladys M. Bonneau, administratrix of said John H. Bonneau, deceased Application March 24, 1953, Serial No. 344,292

5 Claims. (Cl. 15—307)

This invention relates to automatic steam cleaning mechanism for automobile wheels, of a type which can be used in connection with the usual automobile wash rack, although it can be used independently of the car washing mechanism, if desired.

Among the salient objects of the invention are:

To provide two cooperating steam cleaning mechanisms, at opposite sides of a runway for automobiles, with means set in operation by the movement of the wheels of the automobile on said runway, for turning on and off a steam supply, directed against the outer sides of opposite wheels of said automobile for a predetermined distance, as said automobile is moved slowly along said runway;

To provide two cooperating steam cleaning mechanisms with means controlled by said wheels for automatically moving said steam cleaning mechanisms to and from said wheels, and for automatically turning on the steam for a predetermined period and for turning it off again, for the front wheels and for the rear wheels, as they move through a steam cleaning area on said runway;

To provide a steam cleaning mechanism for automobile wheels which includes a carrying frame to move back and forth along each side of an automobile, as it is moved through a washing area, with an operating frame movable transversely on said carrying frame, to and from the wheel to be cleaned, each operating frame carrying a steam nozzle, movable therewith to and from the outer side of said wheel, with means for automatically moving each operating frame and its nozzle to and from the wheel, automatically turning on the steam for a period, and then turning it off again, and automatically moving said operating frame away from said wheel to permit it to be moved forwardly.

Other objects and advantages of my invention will appear from the following more detailed description of one embodiment thereof, taken in connection with the accompanying three sheets of drawings, which I will now describe.

On the drawing:

Figure 1 is a front end elevation of one embodiment of the invention, with parts in vertical section, showing an automobile on the runways to be steam cleaned;

Figure 2 is a plan view thereof locking down on the runways as seen on the irregular line 2—2 on Fig. 1;

Figure 3 is a fragmentary plan view showing one of the steam cleaning mechanisms on one side and on the other side showing the carrier frame which supports and carries the steam control mechanism which is removed to show said carrier frame;

Figure 4 is a vertical side view of a wheel, as seen in the position of line 4—4 on Fig. 2, showing the position of a steam nozzle and also of bearing rollers on the side of the tire;

Figure 5 is an enlarged sectional view of a detail taken on line 5—5 on Fig. 3, lower portion;

Figure 6 is a detail, taken on line 6—6 on Fig. 3, upper portion, and showing a combination of rollers used in mounting the carrier frame and also the operating frame on the carrier frame.

Figure 7:
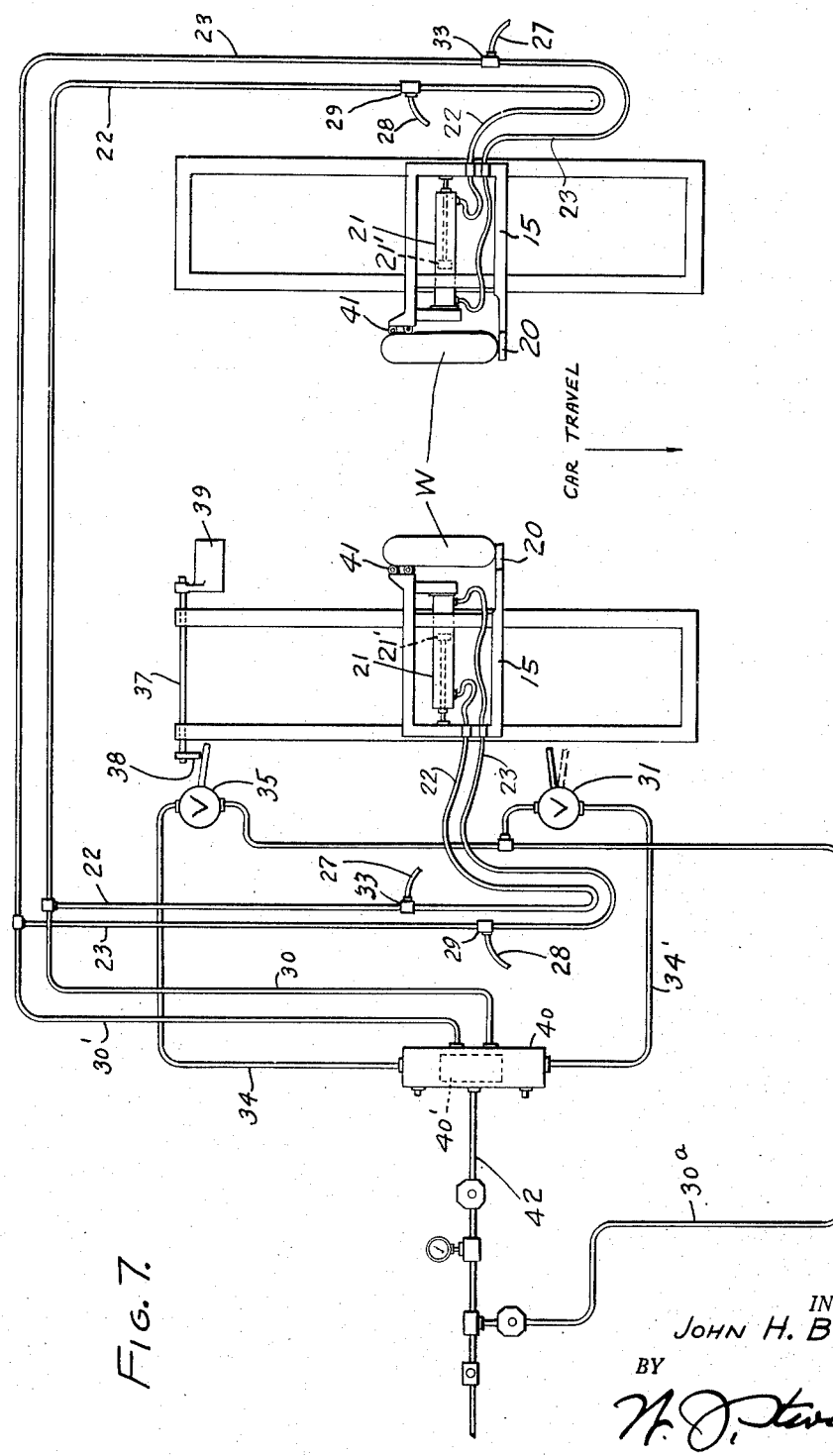
Figure 7 is a diagram illustrating the pressure fluid system for controlling movement of the steam nozzles toward and away from the sides of the wheels.

Referring now in detail to the drawings, I will describe the embodiment of the invention here shown for this purpose.

In Figs. 1 and 2, a suitable foundation 8 is shown, with two spaced runways, as 9, 9, for the wheels of an automobile, shown in place, with a chain C connected therewith for moving the automobile slowly along on said runways 9, 9, in the usual manner.

My invention provides in connection with such a wash rack, two automatic steam cleaning mechanisms for steaming the opposite wheels of an automobile as they are moved slowly along for the usual wash job.

In the invention as here shown for explanatory purposes, two steam cleaning mechanisms are shown at the opposite sides of the main runway for the automobile. This will be understood from Figs. 1 and 2.

Parallel tracks, 10, 10, are provided, preferably of angle or channel iron, and on which the steaming mechanisms move together with the automobile being pulled along the runway.

Each of the steam mechanisms includes a carrier frame, designated 11, and being of square or rectangular form, as seen in the lower portion of Fig. 3. This frame is mounted to run back and forth on the tracks 10, 10, there being one at each side of the main runway.

I have shown a roller combination in Fig. 6 as a typical means by which the carrier frame 11 may be mounted to move along the tracks 10. An operating frame 15 is similarly mounted for movement on said carrier frame in a path normal to the tracks 10. The illustrated roller combination includes a pair of rollers 12 arranged to roll above and beneath a flange portion of the track 10 or along a flange portion of the frame 11, as the case may be, an outer roller 13′ rolling along the edge of said flange portion, as will be observed by reference to Fig. 6. The several roller combinations are designated generally by the reference numeral 13 in Fig. 3.

Mounted upon each of the carrier frames 11, 11, at the opposite sides of the main runways 9, 9, is an operating frame, designated as a whole 15, of square form and seen in plan view in Fig. 3, upper portion. This operating frame is movable back and forth transversely on the carrier frame, or, in other words, said operating frame is movable to and from the side of the wheel to be steam cleaned, as will be explained. The carrier frame and the operating frame movable thereon are movable as a unit back and forth on the tracks 10, 10, at each side of the general runway.

On each operating frame 15 is a steam nozzle 16, with a steam supply valve 17, in a steam supply pipe 18. Also mounted on said operating frame, as a part thereof, is a member 15′, extended across the front end thereof and having on its outer end a bearing and propelling roller 20, adapted to be engaged by the automobile wheel being steamed for the purpose of moving said carrier frame and said operating frame along with and ahead of the automobile during the steaming.

Also on the inner side of each operating frame 15, is an extension member 15″ having on its inner side two bearing rollers, as 41, 41, designed to be moved outwardly against the side of the tire, as indicated in Fig. 4, for holding the steam nozzle 16 in proper relationship to the wheel being steam cleaned.

I will now describe the means for automatically moving said operating frames on the carrier frames to and from the opposite sides of the wheels to be cleaned.

A double acting cylinder 21 is carried by each of said frames, with air supply pipes 22 and 23 connected with its opposite ends. Pressure fluid introduced alternately into opposite ends of the cylinder serves to move said cylinder 21 in opposite directions for moving the operating frame 15, together with the steam nozzle 16, the roller 20, and the wheel engaging rollers 41, 41, transversely on the carrier frame 11, in a horizontal plane toward the wheels to be cleaned and to hold said operating condition for a limited period during the steaming of the opposite wheels simultaneously and to thereafter restore the operating frame to first position.

One end of the air cylinder 21 is connected with the operating frame 15, as at 21″, while the outer end of its plunger or piston rod is connected with the opposite side of the carrying frame 11, as at 21A, Fig. 3, for moving said operating frame back and forth transversely on said carrying frame in a horizontal plane.

The steam control valve 17 is opened and closed by a lever 24, having its outer end connected with a plunger rod 25, Fig. 3, operating in an air cylinder 26, having air supply pipes 27 and 28 connected with its opposite ends, as indicated.

Air pipes 23 and 28 are connected together at a T-coupling 29, which coupling 29 is connected with a flexible air supply hose 30′, extended to a conventional pilot valve 40, Fig. 7, with a valve element 40′ slidable therein and adapted to alternately connect the lines 30 and 30′ to the air pressure existing in the line 42. Such a conventional valve may, for example, be of the well-known type manufactured and sold by the Hydraulic-Pneumatic Company and known in the trade as a four-way pilot valve. Pressure air is supplied to the valve 40 through a control line 42. Pipes 22 and 27 of each unit of the steam mechanisms at opposite sides of the runways are connected with a T-coupling member 33, and to the pilot valve 40 by means of a flexible hose 30. A control valve 35 is fixed at one side of the main frame with a pipe 34 leading therefrom to one end of pilot valve 40. Said control valve 35 is connected with the source of compressed air through line 30a joined to the air line 42 and is operated by a treadle shaft 37 and an arm 38 carried by the shaft. Said treadle shaft 37 has at one end, in the runway, a treadle 39, positioned to be depressed or actuated by the automobile wheel W, as it rolls thereon, whereby to automatically and simultaneously direct air to the cylinder 21, for moving the operating frame 15 out to the wheel, and also to the cylinder 26 for opening the steam valve 17. Thus, as the automobile wheel runs over the treadle 39, it acts to automatically actuate the control valve 35 and direct air under pressure to the cylinder 21 and to the cylinder 26. This results in simultaneously moving the two operating frames to the outer sides of opposite wheels and also to open the steam valve 17, for discharging steam against the outer sides of said wheels as they are moved slowly on said runways.

When the carrier frames 11, 11, reach the end of their travel, one of said frames 11 engages and operates the valve 31, which is also connected with the four-way valve 40 by means of a flexible hose 34′. Said valve 31 is also connected with the main supply of compressed air, as by means of hose 30a.

It will be understood that the automobile wheels, in bearing on the treadle 39, automatically sets in operation two steam cleaning mechanisms at opposite sides of the front wheels of the automobile, and automatically moves said steam cleaning mechanisms along with said wheels for a predetermined distance during the steaming operation, after which the steam supply valve 17 is automatically closed through the cylinder 26, and the operating frames 15 with the steam nozzle and roller 20 and bearing rollers 41, 41, are automatically moved away from the wheels by the cylinders 21, 21, at which time the carrier frames 11, 11 with the operating frames 15, 15 thereon, are automatically moved back to starting position with an accelerated movement to be ready to operate on the rear wheels as they are moved along into the steam cleaning area. This accelerated movement is accomplished by a cable 42 at each side, extended up over a pulley 43, in the upper end of an unstanding tube 44, with a weight 45 in the tube and to which said cable is attached. Said cable at its lower end passes under a pulley 46, and thence to the carrier frame 11, as indicated in Figs. 1 and 2. There is a tube and weight and cable at each side of said mechanisms, for moving them together.

The air pipes or hose are such that they can be carried overhead of the wash rack, or underneath, or along the sides without being in the way of the operating mechanism. This, of course, is immaterial.

The operation of the operating frame 15 on the carrier frame 11 will be apparent from Fig. 7 wherein the several fluid lines are shown completely. As a front wheel of the vehicle to be washed rolls across the treadle 39, the control valve 35 is actuated to effect pressure fluid flow from the line 30a through line 34 to one end of the pilot valve 40. Introduction of fluid into this end of the pilot valve causes the valve element 40′ therein to slide in a direction to open line 30′ and close line 30. Thus, pressure fluid is introduced into the inner ends of the cylinders 21 to force the operating frames 15 toward the wheels to be steam cleaned. Such movement of the operating frames is limited by engagement of the rollers 41 against the outer sides of the tires so as to space the nozzles 16 at a predetermined short distance from the tires.

After the steam cleaning mechanisms have traveled with the front wheels through a distance necessary for the steam nozzles to direct steam against the entire outer sides of the tires, the limit valve 31 is engaged by one of the lower frames 11 and actuated thereby to cause pressure fluid to flow from the line 30a into line 34′ which directs the fluid into the other end of the pilot valve 40. The valve element 40′ thus is shifted in a direciton to close line 30′ and open line 30, the valve 40 having exhaust ports permitting sliding of the valve element. The line 30 directs fluid from the main line 42 into the outer ends of the actuating cylinders 21 so as to effect withdrawal of the upper frames 15 laterally from the front wheels of the vehicle. Through the medium of the cables 42 and weights 45, both frame units 11, 15 are returned to initial position.

Upon subsequent tripping of the treadle 39 by a rear wheel of the moving vehicle, the mechanisms are again set in motion to cause them to be propelled forwardly by the rear wheels and to clean the tires of these rear wheels, the sequence of operations being the same as explained above in connection with the front wheel actuation of the mechanisms. Upon actuation of the limit valve 31 by a rear wheel, the mechanisms are restored to initial position to await the arrival of the front wheels of the next vehicle to be washed.

Thus the movement of the automobile along the runways operates automatically to position the steam cleaning mechanisms at the outer sides of opposite wheels, turns on the steam, and moves the steaming mechanisms along with the wheel being cleaned.

So far as we are aware this is the first time such a complete and automatically controlled and operated steam cleaning mechanism has been produced.

I am aware that changes in the details of construction and arrangement can be made in the mechanisms here shown for explanatory purposes without departing from the spirit of the invention, and I do not, therefore, limit the invention to the showing made for this purpose, except as I may be limited by the hereto appended claims.

I claim:

1. An automatic steam cleaning mechanism for the wheels of a motor vehicle rolling along a pair of runways as the vehicle is propelled therealong; fixed track means extending parallel to and located laterally outwardly from said runways; a carrier frame having roller means engaging said fixed track means and mounting the frame for movement along the tracks in a path parallel to said runways; an operating frame mounted on said carrier frame for reciprocatory movement relative to the carrier frame and in a path extending normal to said track means and runways; a propelling roller carried by said operating frame with its axis extending normal to said runways, said propelling roller being projectable into the path of movement of a wheel of the moving vehicle so as to be engaged by the leading peripheral portion of the wheel and moved thereby to cause the operating and carrier frames to be moved with the vehicle as a unit in a path parallel to said runways; a steam nozzle mounted on said operating frame and movable therewith toward and away from the wheel, said nozzle being adapted to direct steam against the outer side of the wheel; and bearing roller means carried by said operating frame and movable therewith toward and away from the wheel, said bearing roller means being engageable against the outer side of the wheel so as to limit movement of the operating frame toward the wheel and locate the steam nozzle at a predetermined distance from the outer side of the wheel, regardless of the size of the wheel and its lateral position on said runways.

2. A steam cleaning mechanism as defined in claim 1, including: fluid-actuated means for reciprocating said operating frame and associated parts in a path normal to the runways to engage and disengage the wheel; and cable-and-weight means connected to said carrier frame and operative in response to disengagement of the propelling roller from the wheel as the carriage is retracted laterally outwardly from the wheel to move said carrier and operating frames and parts carried thereby in a path parallel to the runways and in a direction opposite to the direction of movement of the vehicle.

3. A mechanism as defined in claim 2, in which said fluid-actuated means includes a control valve, and treadle means arranged at one end of said track means and engageable by the vehicle wheel, said treadle means being operative to actuate said control valve to initiate actuation of said fluid-actuated means.

4. A mechanism as defined in claim 3, in which said fluid-actuated means includes an actuating cylinder having its opposite ends connected to a pilot valve connected to a source of pressure fluid and having a shiftable valve element, and a limit valve connected between a source of pressure fluid and said pilot valve and positioned to be actuated by said carrier frame after the latter travels forwardly through a predetermined linear distance so as to shift said valve element in a direction to effect introduction of pressure fluid into one end of the cylinder and thus cause retraction of the operating frame, propelling roller and steam nozzle in a direction laterally away from the wheel.

5. A mechanism as defined in claim 4 in which said propelling roller and said bearing roller means are so located on said operating frame as to be respectively engageable against leading and trailing portions of the vehicle wheel.

References Cited in the file of this patent
UNITED STATES PATENTS

| | | |
|---|---|---|
| 1,682,902 | Gibson | Sept. 4, 1928 |
| 1,931,444 | Mackin | Oct. 17, 1933 |
| 2,057,388 | Mackin | Oct. 13, 1936 |
| 2,215,692 | Fleming | Sept. 24, 1940 |
| 2,692,214 | Hurst | Oct. 19, 1954 |